United States Patent
Zhang et al.

(10) Patent No.: US 7,194,002 B2
(45) Date of Patent: Mar. 20, 2007

(54) PEER-TO-PEER BASED NETWORK PERFORMANCE MEASUREMENT AND ANALYSIS SYSTEM AND METHOD FOR LARGE SCALE NETWORKS

(75) Inventors: Qian Zhang, Wuhan (CN); Wenwu Zhu, Basking Ridge, NJ (US); Jiangchuan Liu, Kowloon (HK); XinYan Zhang, Nanjing (CN)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 10/061,481

(22) Filed: Feb. 1, 2002

(65) Prior Publication Data

US 2003/0147386 A1    Aug. 7, 2003

(51) Int. Cl.
*H04L 12/28* (2006.01)

(52) U.S. Cl. .................................. 370/400; 370/338

(58) Field of Classification Search ........ 370/254–258, 370/400–410, 422, 424–425; 709/208–211, 709/249, 223–224
See application file for complete search history.

(56) References Cited

U.S. PATENT DOCUMENTS

| | | | |
|---|---|---|---|
| 5,704,032 A * | 12/1997 | Badovinatz et al. ........... 714/4 |
| 5,878,032 A | 3/1999 | Mirek et al. |
| 5,987,376 A | 11/1999 | Olson et al. |
| 6,003,030 A | 12/1999 | Kenner et al. |
| 6,385,201 B1 * | 5/2002 | Iwata .......................... 370/400 |
| 6,507,863 B2 * | 1/2003 | Novaes ........................ 709/201 |
| 6,532,237 B1 * | 3/2003 | Or et al. ...................... 370/396 |
| 6,545,979 B1 | 4/2003 | Poulin |
| 6,584,110 B1 | 6/2003 | Mizuta et al. |
| 6,744,734 B1 * | 6/2004 | Iliadis et al. ............. 370/238.1 |
| 6,754,181 B1 | 6/2004 | Elliott et al. |
| 6,785,237 B1 | 8/2004 | Sufleta |
| 6,839,752 B1 * | 1/2005 | Miller et al. ................. 709/224 |
| 2001/0021176 A1 | 9/2001 | Mimura et al. |
| 2002/0055999 A1 | 5/2002 | Takeda |
| 2002/0085719 A1 * | 7/2002 | Crosbie ....................... 380/248 |
| 2002/0141343 A1 | 10/2002 | Bays |

(Continued)

FOREIGN PATENT DOCUMENTS

EP          0800329          10/1997

(Continued)

OTHER PUBLICATIONS

Banerjee, et al., "Estimating Available Capacity of a Network Connection", Conference Proceedings, Sep. 5, 2000, pp. 131-138.

(Continued)

*Primary Examiner*—Doris H. To
*Assistant Examiner*—Thai Hoang
(74) *Attorney, Agent, or Firm*—Lee & Hayes, PLLC

(57) ABSTRACT

A network performance (e.g., latency and bandwidth) measurement infrastructure for large scale networks based on self-organized probing groups of devices. Each group of devices has a lead device that measures network characteristics, and then shares the measurement information with other devices. This grouping method reduces the amount of network bandwidth needed for adequate measurements, while still providing necessary information to individual devices. The system utilizes a novel multicast-based algorithm that is adopted for both intra-group and inter-group performance measurement. The measurement groups (Me-Groups) are dynamic and self-forming, and use a set of heuristic algorithms to optimize the dynamic groupings.

26 Claims, 11 Drawing Sheets

U.S. PATENT DOCUMENTS

| | | | |
|---|---|---|---|
| 2002/0143998 A1* | 10/2002 | Rajagopal et al. ......... | 709/248 |
| 2003/0048780 A1 | 3/2003 | Phomsopha | |
| 2003/0107990 A1 | 6/2003 | Herschleb et al. | |
| 2003/0115321 A1 | 6/2003 | Edmison et al. | |

FOREIGN PATENT DOCUMENTS

| | | |
|---|---|---|
| WO | WO0001115 | 1/2000 |
| WO | WO0079734 | 12/2000 |
| WO | WO0188734 | 11/2001 |
| WO | WO0193064 A1 | 12/2001 |

OTHER PUBLICATIONS

Downey, "Clink: a tool for estimating Internet link characteristics", Jul. 19, 1999, 5 pages.

Kurose, et al., "Peer-peer and Application-level Networking", Online!, available at <<http://www-net.cs.umass.edu/cs791n/class2.ppt>> Sep. 14, 2001, pp. 1-32.

Lai, et al., "Measuring Bandwidth", Infocom -99, 18th Annual Joint Conference of the IEEE Computer and Communications Societies. Proceedings. IEEE New York, NY, Mar. 21-25. pp. 236-239.

Mah, "Pchar: A Tool for Measuring Internet Path Characteristics", Feb. 12, 2005, 3 pp.

Paxson, "Measurements and Analysis of end-to End Internet Dynamics", Apr. 1997, 389 pages.

Postel, "RFC 791: Internet Protocol", IETF Request for Comments, Sep. 1981, pp. 1-49.

Postel, "User Datagram Protocol UDP—RFC 768," IETF RFC, Aug. 28, 1980, 3 pages.

Van Jacobson, "Pathchar—a tool to infer characteristics of Internet paths", Apr. 21, 1997, 21 pages.

Francis, Paul et al., "An Architecture for a Global Internet Host Distance Estimation Service," Mar. 1999 (17 pages).

Dykes, Sandra G. et al., "An Empirical Evaluation of Client-Side Server Selection Algorithms," 2000 (10 pages).

Guyton, James D. et al., "Locating Nearby Copies of Replicated Internet Servers," Feb. 1995 (18 pages).

Myers, Andy et al., "Performance Characteristics of Mirror Servers on the Internet," Mar. 1999 (9 pages).

Stemm, Mark et al., "A Network Measurement Architecture for Adaptive Applications," Mar. 2000 (10 pages).

"Internet Performance Measurement and Analysis Project; User's Guide (version 1.0)," 1998 (7 pages).

Paxson, Vern et al., "An Architecture for Large-Scale Internet Measurement," Aug. 1998 (9 pages).

Adams, A. et al., "The Use of End-to-End Multicast Measurements for Characterizing Internet Network Behavior," Feb. 2000 (10 pages).

Kegel, Dan, "NAT and Peer-to-Peer Networking," 1999 (4 pages).

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M. Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

* cited by examiner

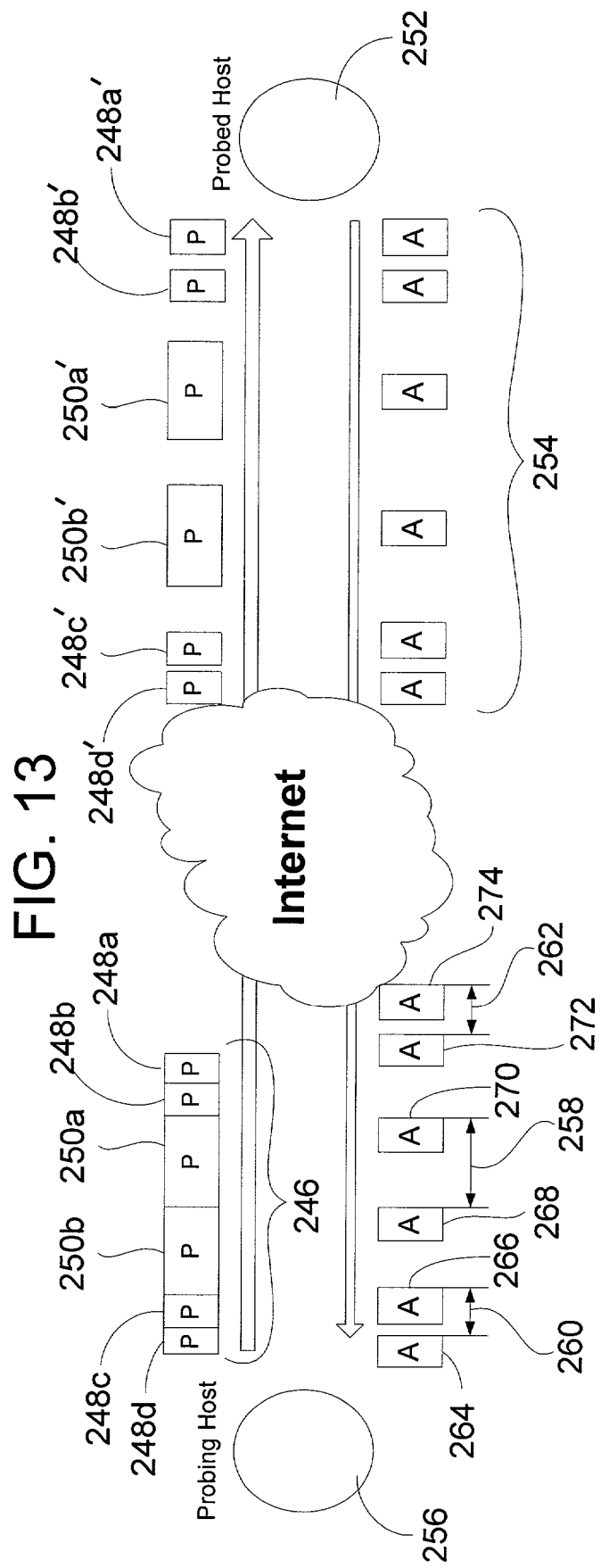

PEER-TO-PEER BASED NETWORK PERFORMANCE MEASUREMENT AND ANALYSIS SYSTEM AND METHOD FOR LARGE SCALE NETWORKS

FIELD OF THE INVENTION

The present invention relates generally to network performance measurement systems, and more particularly to distributed performance measurement infrastructures for large scale networks such as, e.g., the Internet.

BACKGROUND OF THE INVENTION

As the number of users and traffic volume continue to grow on the Internet, it becomes essential that a set of network performance metrics and measurement methodologies should be available to allow both the users and network service providers to have an accurate, common understanding of the performance and reliability of given Internet paths. Such understanding should include information on what segment of a given Internet path limits that performance and reliability. On the users' side, once equipped with a set of network performance metrics and measurement tools, it will become much easier to have an accurate knowledge of what kind of service they are getting. With this information the users will be able to compare the relative performance of the various network service providers. Similarly, knowledge from network performance measurement will also enable the network providers themselves to intelligently deploy more powerful switches to boost network capacity. Likewise, content-based service providers can use this information to optimally deploy and manage their web servers.

That is, this performance information may be used by many Internet services and systems to enable the creation of robust overlays for peer-to-peer systems or application-level multicast trees, by users to enable the selection of a server among multiple server mirrors, and by service providers to determine the placement of server replicas to improve the performance of content distribution networks. Despite many proposals on building an Internet measurement infrastructure from the research community, however, it is hard for such an infrastructure to be fully deployed and operational in the near future, due to both the scale and the complexity of the Internet.

It is increasingly the case that a given service request from a client can be fulfilled by one of several Internet servers. Examples range from short-lived interactions such as a single Web page access to a Web server, to the long-term peering relationship between two news (NNTP) servers. In all such interactions with all other things being equal, it is advantageous to access the "nearest" server with low latency or high bandwidth. Even when all other things are not equal, for instance when different Web servers have different response times, it is still useful to include the distance to each candidate host as a factor in making a selection.

There have been several research efforts on network performance measurement and analysis, the teachings and disclosures of which are incorporated in their entireties by reference thereto, including: P. Francis et al., "An Architecture for a Global Internet Host Distance Estimation Service," Proc. of IEEE INFOCOM 1999, March 1999; Sandra G. Dykes, Clinton L. Jeffery, and Kay A. Robbins, "An Empirical Evaluation of Client Side Server Selection Algorithms," Proc. of IEEE INFOCOM '2000, 2000; James D. Guyton and Michael F. Schwartz, "Locating Nearby Copies of Replicated Internet Servers," Proc. of ACM SIGCOMM '95, pp. 288–298, 1995; and A. Myers, P. Dinda, and H. Zhang, "Performance Characteristics of Mirror Servers on the Internet", Proc. of IEEE INFOCOM '99, March 1999. All these efforts have reached the common understanding that the establishment of an Internet performance measurement infrastructure is the ultimate solution for the optimal operation and healthy growth of the Internet.

One method to obtain network performance information is for each of the initiating hosts to measure the network performance itself, using either unicast or multicast tools. However, if a large number of hosts were to make independent and frequent measurements, this would have a severe impact on the Internet. Unfortunately, in current systems measurements made by one host are not made available to otherhosts. This increases the measurement overhead of such systems as each host that needs the information must independently measure it. As a result, due to both the scale and the complexity of the Internet, it is unlikely that a measurement infrastructure of such a scale will be deployed and fully operational in the near future. This problem is further exacerbated by the fact that the Internet is still growing at an exponential rate.

There exists, therefore, a need in the art for a network performance analysis architecture that is scalable to large scale networks such as the Internet, but that is not burdened by large measurement overhead.

BRIEF SUMMARY OF THE INVENTION

The system and method of the present invention presents new and improved measurement infrastructure for large scale networks. More particularly, the system and method of the present invention presents a new and improved measurement infrastructure that utilizes distributed groups and shared performance estimations to reduce measurement overhead in the large scale network.

More specifically, an embodiment of the present invention presents a measurement infrastructure, referred to herein as gMeasure, for large scale networks. This infrastructure is based on self-organized probing groups (measurement groups or MeGroups) that are distributively deployed in the network and that share the measured network performance information effectively. A feature of the infrastructure of the present invention is that it estimates/infers the overall network performance by exploiting to the fullest extent the data collected by individual measuring hosts and the data collected by its neighboring groups. Hosts are self-organized into MeGroups to form a scalable hierarchical structure. A novel multicast-based algorithm is adopted for both intragroup and inter-group performance measurement. Moreover, a set of heuristic algorithms are used to optimize the group organization and improve estimation accuracy. The collaboration among the neighborhoods keeps the measurement overhead very low and allows for scalability to large scale networks.

In each of the several self-organized measurement groups (MeGroups) of the gMeasure infrastructure there is a group lead. The group lead of each of these performance probing groups is in charge of the data dissemination within its group and among its neighboring groups. This group lead is dynamically elected to act as a representative for inter-group performance measurement. A host obtains the network performance by actively measuring the network performance in a local scale, and then by sharing this measured information with other hosts in the same group. The group lead also exchanges the measured information with the group leads from other MeGroups that are its neighbors.

In one embodiment, the gMeasure infrastructure includes three primary functions. The data collection function measures the network condition such as, e.g., latency and bandwidth. The data sharing function is used to enable prediction of the network condition based on sharing the measured network performance information obtained from the other hosts in the same probing group, and the performance information obtained from the neighborhood groups. Finally, the data dissemination function shares the measured network performance information with other hosts in the same group and with the neighboring groups. A feature of the measurement architecture is that it relies partly on active probing and it exploits the network performance statistics from data sharing and data prediction to achieve the network performance determination with minimal overhead.

In an embodiment of the present invention, in order to build the network performance measurement services and provide related functionalities to distributed applications, gMeasure provides for self-organizing probing groups of hosts with a primary focus on groups that have an aggregatable identifier and on network performance based groups. The infrastructure also includes group selection mechanisms for implementing choice among probing groups for measured network performance. These mechanisms also support dynamic group reforming. The data dissemination provided by the infrastructure of the present invention uses the probing groups to optimize the measured data distribution. Finally, the infrastructure of the present invention provides a capacity monitoring mechanism that is built on top of the data dissemination and integrated performance monitoring tools. This mechanism provides real-time reports of currently available network performance.

Embodiments of the gMeasure infrastructure of the present invention incorporate one or more of the following design features. One such feature is that the infrastructure is distributed. That is, the probing groups and measurement services can be deployed in multiple locations across the Internet. The infrastructure is also decentralized, i.e. the measured information is collected and analyzed locally. Decisions are also made locally, requiring no central authority. While building a fully decentralized system is difficult, embodiments of the present invention still make critical actions distributed, such as data dissemination and performance prediction, which is still quite beneficial to the whole system. Additionally, embodiments of the present invention are tiered having cooperating components that organize themselves into tiers. Each tier represents a different trade off between breadth of view, accuracy, detail, and timeliness of its knowledge of the rest of the system.

Embodiments of the infrastructure of the present invention may also be organic. As hosts are added to a network, the hosts are automatically integrated and the network measurement infrastructure reconfigured. Further, the infrastructure of the present invention presents good balance, recognizing that there is a tradeoff between network traffic analysis and prediction accuracy. In general, the more measurement data gathered, the more accuracy can be provided. While the analysis is more accurate if the network is measured every 5 minutes than if it is measured once every hour, a balance must be struck. If not, the frequent probing of the network by every host will result in the probing itself becoming a traffic source that slows the very network performance it is attempting to measure. It is this tradeoff between measurement overhead and accuracy for traffic probing and analysis for which a balance is found. Finally, the network performance measurement is performed in an efficient way.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 13 is a simplified communications flow diagram illustrating a packet train probing approach in accordance with the teachings of the present invention.

Figure 1:
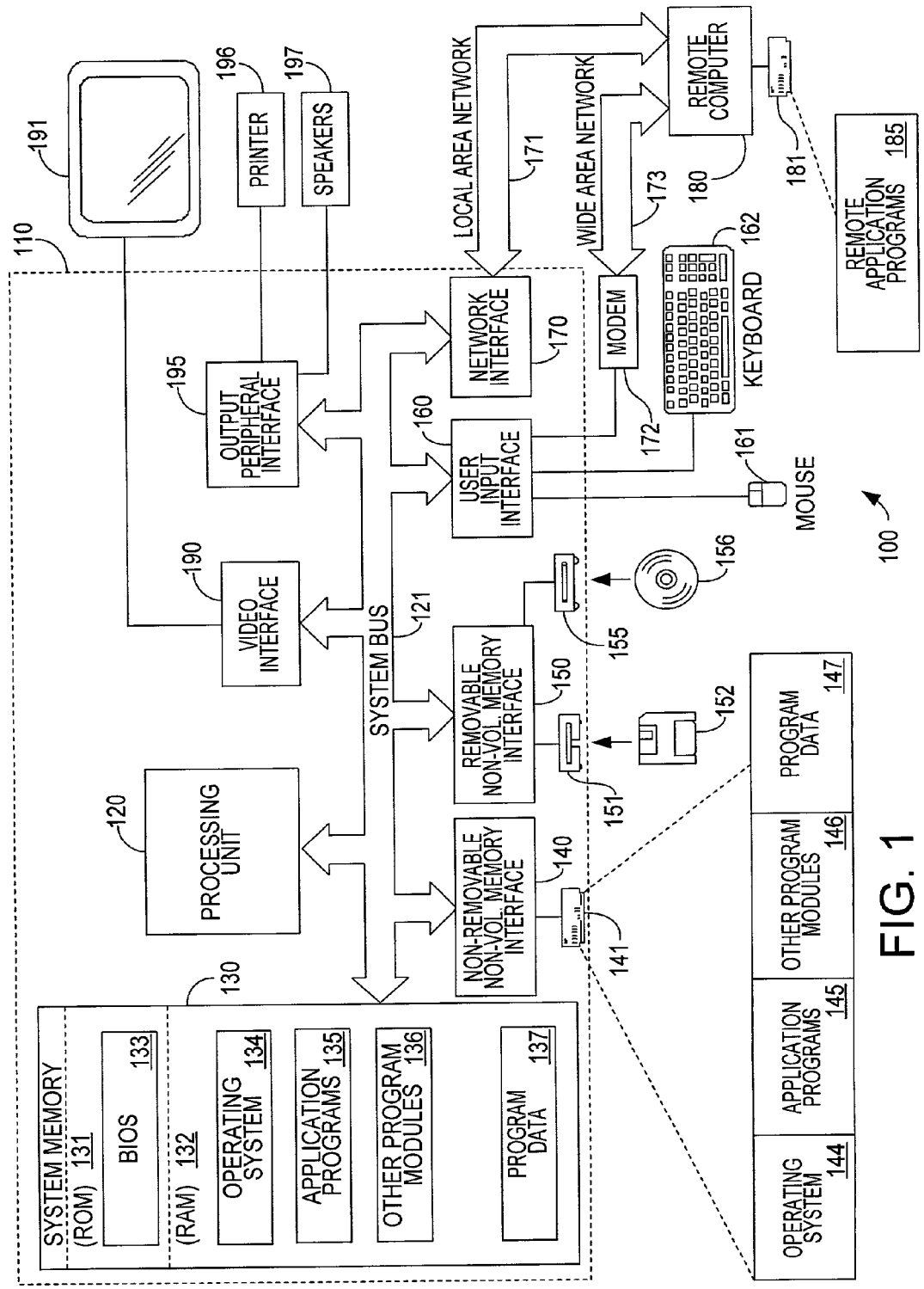
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the network measurement infrastructure of the present invention network performance information, distance, is provided in terms of latency (e.g., round-trip delay) and, where possible, bandwidth. Latency is the easiest sort of information to provide, and typically the most generally useful. There are two reasons latency information is easy to provide. First, it is easy to measure in that only a small number of packets are required to produce a good coarse-grain estimate of the network latency. Second, two different paths through the network may have the same latency such that while the probing packets used for the latency determination may not travel the same path as the path actually taken by the users' data packet, the reported latency would still be useful.

Bandwidth is also clearly important for many applications, but compared to latency, bandwidth is more difficult to provide. Bandwidth is also more expensive to measure, and is more sensitive to the exact path. Indeed, a single low-bandwidth link in the network path dictates the bandwidth for the whole path. It may also be that there is a rough correspondence between latency and bandwidth. That is, the lower the latency between two hosts, the higher the bandwidth is likely to be. This correspondence allows applications that need high-bandwidth to select services/servers/paths that have a minimized latency as a first approximation. Although it is hard to measure the bandwidth metric in large scale network, the system of the present invention utilizes TCP probing packets to accomplish such measurement, as will be discussed in detail hereinbelow.

To derive a distance estimate, one embodiment of the present invention utilizes a triangulation technique. To understand this technique, suppose the hosts in the large scale network construct a graph G with the set of vertices V. A cost function C is said to satisfy the triangular inequality for all vertices A, B, C in a graph, $$C(A,C) \leq C(A,B) + C(B,C) \quad \text{Equation 1}$$

If the network metrics C(A, B) and C(B, C) are known, then from the triangle inequality of Equation 1 it may be seen that the network metric C(A,C) is bounded above by C(A, B)+C(B, C), and below by |C(A, B)−C(B, C)|. That is $$|C(A, B) - C(B, C)| \leq C(A, C) \leq C(A, B) + C(B, C). \quad \text{Equation 2}$$

In particular, if C(A, B) is very small, C(B, C) may be used to estimate C(A, C), which is C(A, C)=C(B, C), where C(A, B)<<C(B, C). In the following description, (A, B) will be used to represent C(A, B). Deriving a distance estimate from this bound has been referred to as "triangulation" in, e.g., P. Francis et al., "An Architecture for a Global Internet Host Distance Estimation Service," Proc. of IEEE INFOCOM 1999, March 1999, the teachings and disclosure of which are hereby incorporated in their entireties by reference thereto. This assumption is based on a further assumption of efficient routing. By efficient routing it is meant that Internet routing does indeed strive to find low-latency paths, and that the routes uses by two nearby hosts will not be drastically different from each other. Fortunately, in most of the cases the routing situations provide a good basis for such an assumption.

The system of the present invention also assumes that nearby hosts have similar latency to other hosts. In an embodiment of the present infrastructure, two hosts A and B are "nearby" to one another if the round trip time from A to B is less than T, i.e. RTT(A,B)<T, where T is a small value, acting as a threshold. T is an important parameter in probing group formation procedure discussed hereinbelow. It affects the accuracy and performance of the whole system. As defined, all nearby hosts have a low latency to a specific host, and the triangulation assumption indicates that each nearby host should have a similar RTT to all other nearby hosts because they each have a small latency to each other.

With these background concepts clearly in mind, attention is now focused more directly on the infrastructure of the present invention (gMeasure). This infrastructure primarily provides an estimate of the network performance between any two hosts in a large scale network, such as between any two valid IP addresses on the Internet. This function significantly differentiates gMeasure from other services that also provide network performance information, e.g., the SPAND, IPMA, NIMI, and MINC projects discussed in M. Stemm, R. Katz, and S. Seshan, "A Network Measurement Architecture for Adaptive Applications," Proc. of IEEE INFOCOM '00, pp. 2C–3, March 2000; C. Labovitz et al., "Internet performance measurement and analysis project," url: http://www.merit.edu/ipma/, 1998; V. Paxson, J. Mahdavi, A. Adams, and M. Mathis,"An Architecture for Large-Scale Internet Mea-surement," IEEE Communications Magazine, vol. 36, no. 8, pp. 48–54, August 1998; and A. Adams et al., "The Use of End-to-End Multicast Measurements for Characterizing Internal Net-work Behavior," IEEE Communications Magazine, pp. 152–158, May 2000. These projects serve various purposes, such as general Internet characterization, maintenance, fault-isolation, and end-system distance estimation. The measurement infrastructure of the present invention, however, is a distributed measurement architecture that provides network performance information between any two arbitrary points in a large scale network, e.g. the Internet.

Previous attempts at creating network measurement services to drive application adaptation policies have focused primarily on isolated measurements of network statistics. By isolated measurements, it is meant that applications individually make measurements of the state of the network, and that they do not share this measurement information with other hosts. With the increase in applications that require distance information, such as peer-to-peer file sharing and client-hosted multiplayer gaming, the aggregated load of this isolated, centralized network measurement will scale on the order of $N^2$, where N is the number of hosts in the network. This results in a huge amount of measurement traffic, and actually makes the network heavy loaded.

Quite to the contrary to such prior methods, the infrastructure of the present invention measures the network performance based on a probing group concept, which does not heavily load the network. A probing group is constructed by the nearby hosts. This "nearby" characteristic of the probing group provides a good environment for performance measurement and prediction. As discussed above, if two hosts are nearby to each other in terms of network topology, it is likely that they are share the same bottleneck link to a remote site. As a result, the network performance that they measure to this site is likely to be similar. Therefore, it is unnecessary and undesirable for each of these hosts to independently probe the network to find this information. In the infrastructure of the present invention, the multiple nearby hosts share their measurement information with each other to minimize the probing necessary, thereby minimizing the network loading resulting from such probing.

A probing group, or measurement group (MeGroup) is defined as a set of hosts that are nearby to a specific host, called the leader of the group. This definition has several advantages. First, the "nearby" characteristic of the MeGroup provides a good environment for measurement and prediction. It is more efficient than independent probing because multiple hosts can share their measurement information with one another. Second, the dynamic characteristic of the MeGroups, discussed hereinbelow in detail, makes the architecture of the present invention more scalable to the heterogeneous Internet.

Every MeGroup typically has several hosts, one of which is the leader. The leader in a MeGroup is responsible for performing inter-group measurement, which measures the distance between leaders of each group. This measurement result is then disseminated to each group member. Additionally, the leader of the MeGroup is responsible for intra group measurement, which measures the distance between hosts within that leader's MeGroup. As will be discussed in detail hereinbelow, an embodiment of the present invention utilizes a multicast method to perform this measurement. Indeed, such a method can be applied to both measurements (inter-group and intra-group) to efficiently obtain the full-mesh network performance information. Thus, preferably each host in the whole network will be aware of the intra-group network performance, which is the full-mesh performance information of the whole group. Indeed, this will be frequently measured within each group. Each host in the whole network will also preferably be aware of the inter-group network performance, which is the full-mesh performance information between the group leaders. This represents the network performance between neighborhood groups based on the nearby characteristic discussed above. This information is measured in one embodiment by exchanging information among group leaders.

Figure 2:
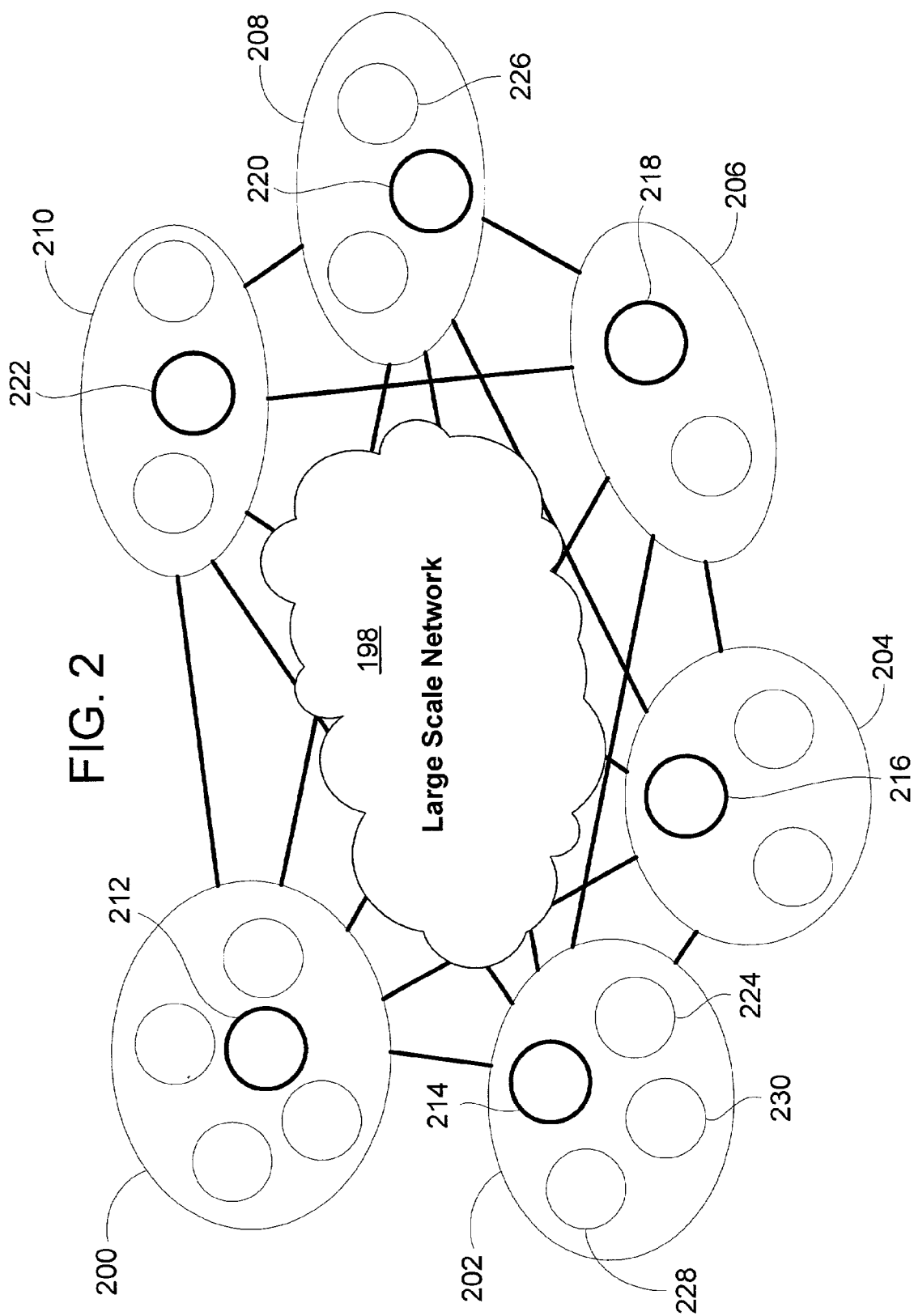
FIG. 2 is a simplified graphical illustration of distributed probing groups organized and operating in accordance with the teachings of the present invention.

FIG. 2 illustrates a simplified example of the probing groups of the present invention in a large scale network 198. There are six probing groups 200–210 in this FIG. 2, each with a group leader 212–222, which takes care of the data sharing among the hosts within the same group and in the neighborhood groups. When host 224 in group 202 obtains the network performance between remote host 226 in group 208 by active probing,the host 224 disseminates that information to all the other hosts 214, 228, 230 in the same group 202. The group leader 214 for group 202 then disseminates this performance information to all the group leaders 212, 216 in its neighborhood groups 200, 204. If another host 230 in this group 202 needs to know or wants to estimate the network condition between itself 230 and the remote host 226, it need not perform any active probing. Instead, the host 230 can predict the network performance based on the shared information obtained originally by and communicated from host 224.

However, upon a first instance of determining network performance between hosts in two remote groups, i.e. there is no prior shared information of such performance that may be used, the host must determine the performance itself. As an example, assume that host 224 in group 202 wants to estimate the network condition between itself 224 and the remote host 226 in group 208. Since none of the hosts in group 202 had measured the network performance to a destination (any host) in group 208, there is no historical information that can be shared within the same group 202. However, the infrastructure of the present invention strives to use shared knowledge to obviate the need to do active performance measurement, thus minimizing network loading and overhead.

Figure 3:
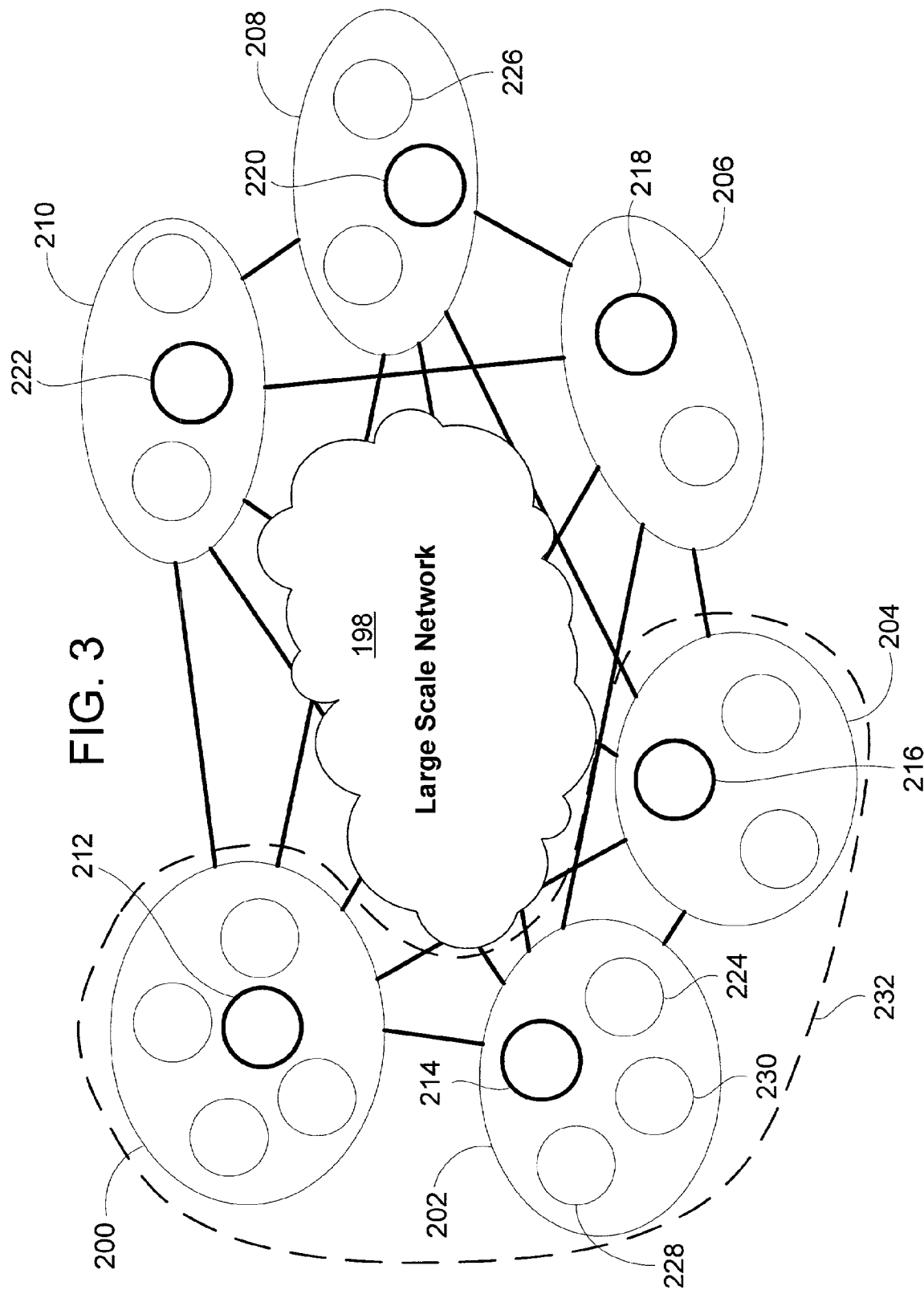
FIG. 3 is a simplified graphical illustration of the distributed probing groups of FIG. 2, organized and operating in a tiered manner in accordance with the teachings of the present invention.

In accordance with this feature, network performance information existing from the neighborhood groups 200, 204 is used to estimate or predict the network performance. FIG. 3 illustrates this tiered data sharing. The probing group 202 and its neighborhood groups 200 and 204 dynamically form a second tier group 232 in an ad hoc way. In this second tier group 232 the measured network conditions between group 200 and 208 and between group 204 and 208 is disseminated through the group leaders 212, 216 of group 200 and 204 to the group leader 214 of group 202. The leader 214 of group 202 then disseminates the information to the hosts 224, 228, 230 within group 202. In this way, host 224 can predict the network performance by sharing the information from the groups in this second tier group 232 hierarchically and organically. Only if no meaningful information can be obtained in this way will the host 224 have to determine the network performance itself.

Figure 4:
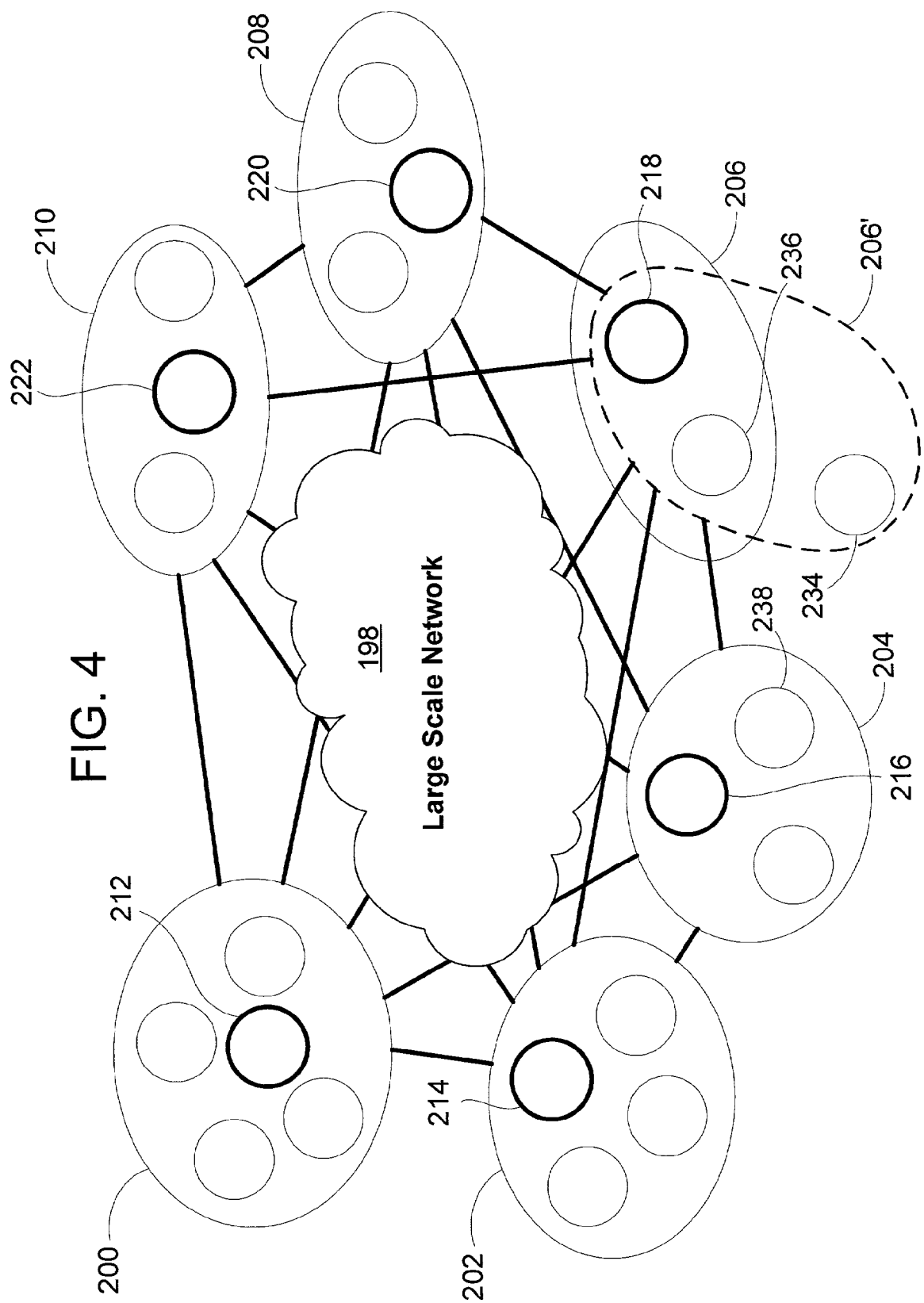
FIG. 4 is a simplified graphical illustration of distributed probing groups of FIG. 2, organized and operating to include a new host in accordance with the teachings of the present invention.

Referring now to FIG. 4, the organic nature of the MeGroups will be discussed as a new host 234 enters the network 198, resulting in MeGroup reformation. When a new host 234 becomes part of the network 198, that host 234 can either join an existing nearby group or establish a new group. The decision for which is made by the new host 234 by first probing to all the existing group leaders 212–222 to try to find a nearby group to join. If no such nearby group exists, the host 234 will then establish a new probing group and act as the group leader. In FIG. 4, the new host 234 has found that group 206 qualifies as a nearby group. This host 234 then joins this group now designated as reformed group 206', the process of which will be discussed more fully hereinbelow.

After the new host 234 has joined group 206', there are three hosts 218, 234, 236 in this group 206', with host 218 serving as the group leader. However, among these hosts 218, 234, 236 that now make up the group 206', host 218 may no long be the best candidate for the group leader due to, for example, its physical location relative to the current group members. The group leader is the host that needs to disseminate all the shared information among all the member hosts in this group, and therefore should be central to all the members. This centrality is also important so that the latency information shared from the leader most closely approximates the latency that will be seen by any one of its group members. In this case, according to group reforming policies discussed below, the host 236 takes the responsibility as a group leader. After this group 206' reforming, hosts in the neighborhood groups 204, 208 are notified about the change of group leader.

Figure 5:
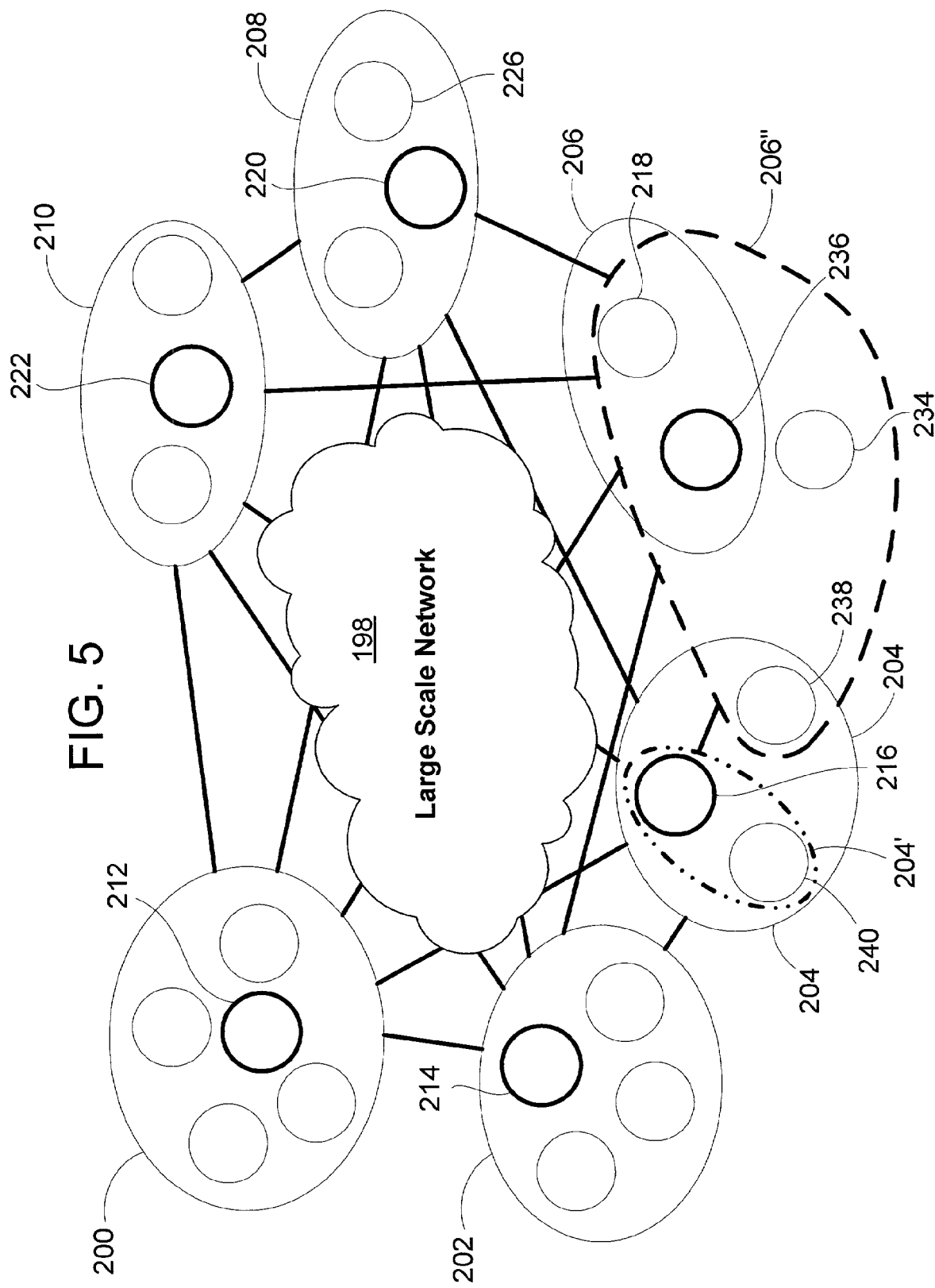
FIG. 5 is a simplified graphical illustration of distributed probing groups of FIG. 4, organized and operating to reform the probing groups after the inclusion of a new host in accordance with the teachings of the present invention.

Once this information has been disseminated, some hosts currently membered in other groups may find that their current membership is no longer appropriate. This may be because the new group leader 236 of the reformed group 206' is closer than its current group leader. Such a situation is illustrated in FIG. 5 wherein host 238 finds that it would be more suited for it to take host 236 as its group leader. In this case host 238 leaves group 204 and joins the group illustrated as reformed group 206". This leaves hosts 216 and 240 in a new group 204' having only two members. This dynamic characteristic makes the measurement architecture of the present invention more scalable to the heterogeneous Internet 198. These processes illustrated continually take place as new hosts enter and old hosts leave the network. Even although there is no host that enters or leaves the network, these processes can also take place when the network conditions are varied.

Figure 6:
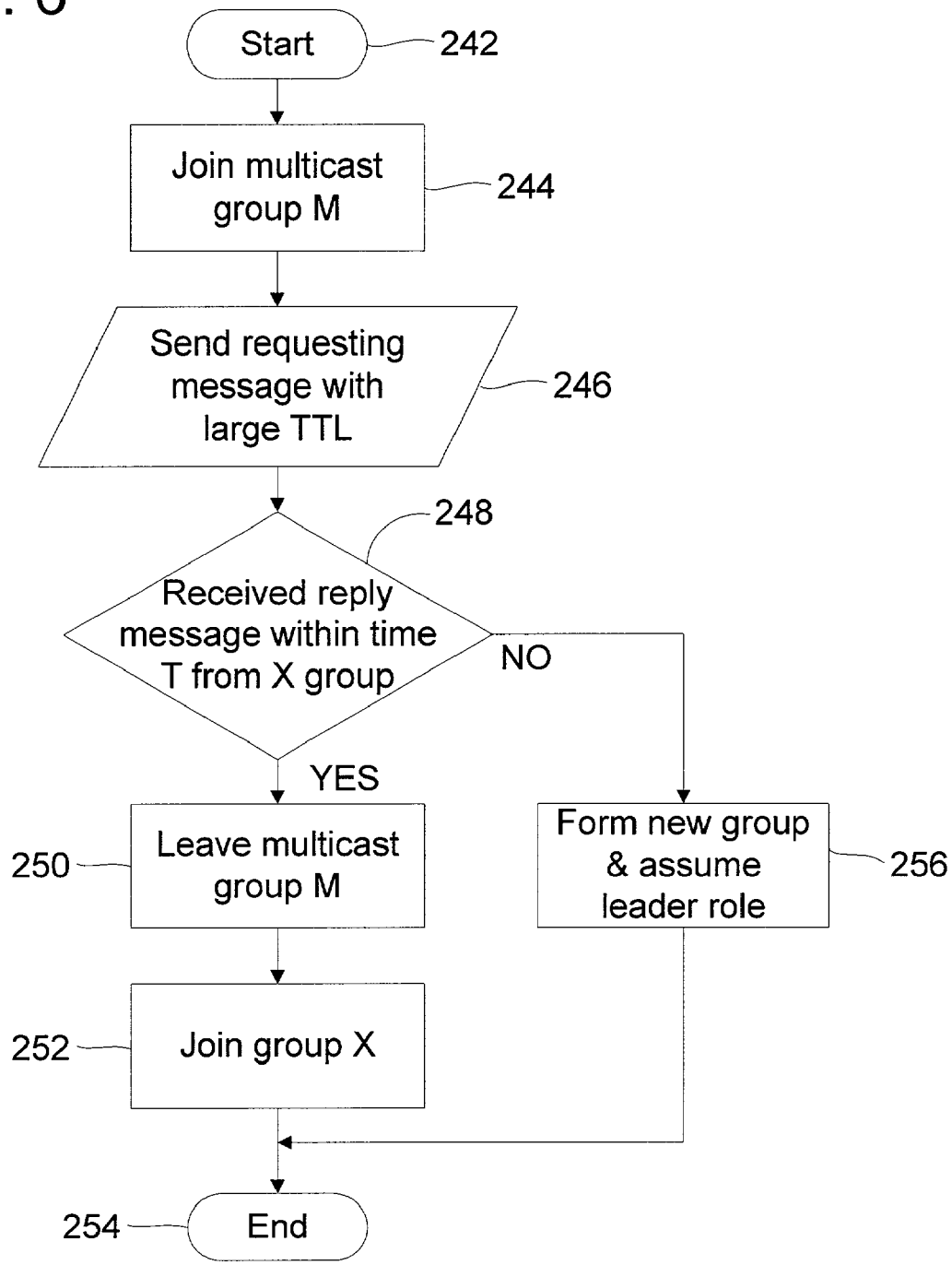
FIG. 6 is a simplified flow diagram illustrating the method of locating an existing probing group in accordance with the teachings of the present invention.

The discussion above illustrated the organic formation and reformation of the MeGroups in a graphic way. In the discussion that follows, the details of each of these functions will be explored. With regard to the formation of MeGroups, it is worth repeating that each such group is comprised of "nearby" hosts. As such, the forming process of a MeGroup is concerned with finding such nearby hosts. For nearby conception, a multicast solution is practical and efficient. In one embodiment of the present invention, all of the group leaders join a unique multicast group M, which is used by the hosts to form the measurement groups. As discussed above, when a new host comes in to the network, it can join an existing group or establish a new group. As illustrated in FIG. 6, once this process begins 242, the new host joins 244 the multicast group M in an effort to find a group. The new host then sends out 246 a requesting message with a large enough TTL (Time To Live) to find a nearby group. Once a group leader receives the requesting message, it will reply with a replying message immediately. This replying message preferably contains MeGroup information that will be useful for the new host, e.g. the group ID and the IP addresses of the group members. If 248 the new host receives the replying message from a MeGroup, e.g. MeGroup X, within a pre-defined latency of T, it will leave 250 the multicast group M and begin joining 252 MeGroup X, the details of which are explained below. If 248 the new host does not receive any replying message within the pre-defined latency of T, this host will form 256 a new MeGroup, and act as the group leader. This process then ends 254.

Figure 7:
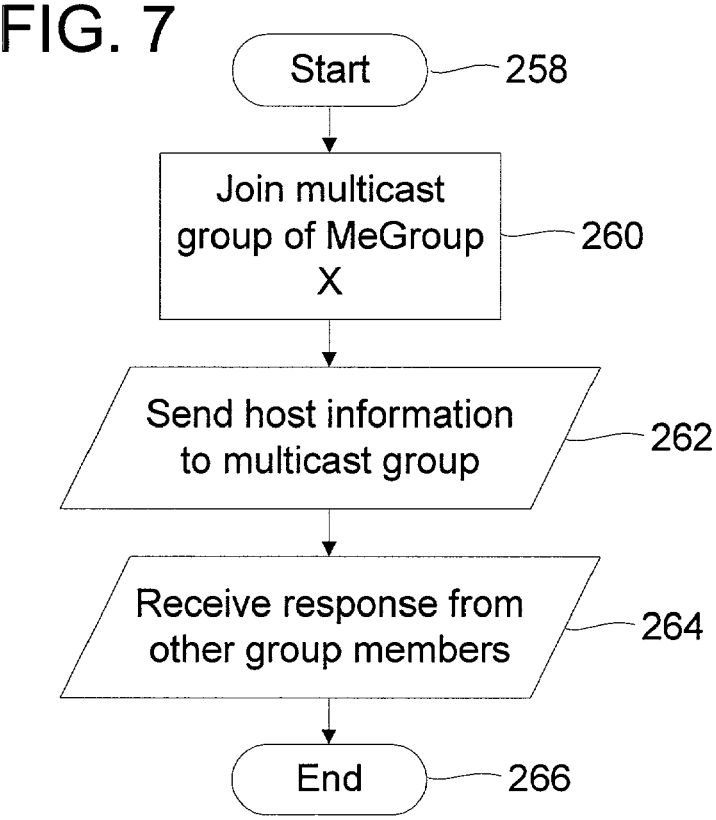
FIG. 7 is a simplified flow diagram illustrating the method of joining a probing group in accordance with the teachings of the present invention.
Figure 8:
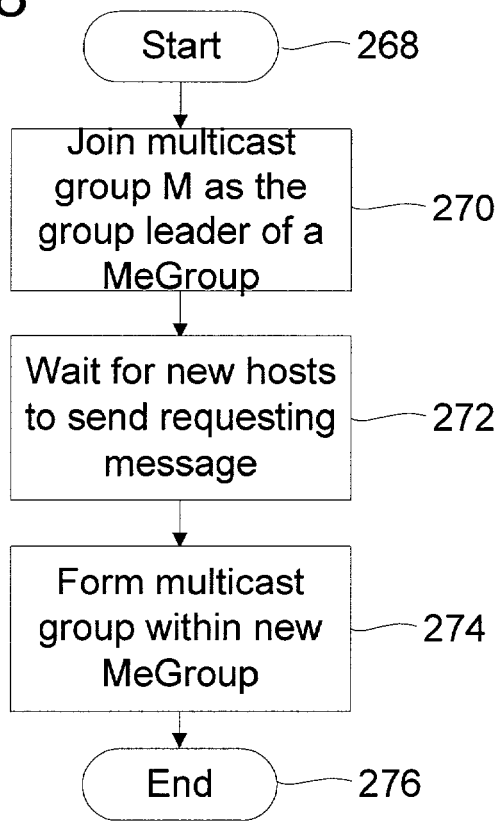
FIG. 8 is a simplified flow diagram illustrating the method of forming a probing group in accordance with the teachings of the present invention.

As illustrated in FIG. 7, once started 258, the process of joining a group such as MeGroup X has the new host join 260 a multicast group of that MeGroup X. The host introduces itself to the whole group by sending 262 at least its IP address information using multicast. The new host learns 264 of the other member hosts in MeGroup X from their responses to the introduction multicast. If, however, the new host decides to setup a new group, the process of FIG. 8 is started 268. First, the host joins 270 the multicast group M, identifying itself as a group leader. The host then acts as the leader of this new group and waits 272 for new hosts to join in. The host will establish 274 a multicast group within the MeGroup that all the members in the MeGroup will join for the efficient transference of measurement data. This process then ends 276.

As described above, the infrastructure of the present invention also provides reformation of the MeGroups by organic self-organization. The basic group formation algorithm just discussed will form a rather stable group. In other words, once a host joins a group, it will not leave this group in its lifetime. This characteristic, however, is not efficient for the measurement and estimation stages of the system of the present invention. If group membership were to be for the lifetime of the host on the network, the group members may suffer because the group may no longer be suited for one of the hosts. That is, according to the basic group join algorithm, in the early stage a new host may find a group to join in that is the best group at that time. However, as time goes by, some new groups may have been created that would be more suitable than the original group for that host. In the following sessions, a heuristic method, host jumping, is introduced in the present invention to improve the system performance in such case.

Additionally, hosts within such a stagnant group may suffer because the leader is no longer suited for the group. The group leader in the basic group forming algorithm is the host who cannot find a nearby group when it first comes in to the network. Once the host becomes a group leader, it will not change during its life time under the base algorithm. This is not an optimal solution since it may not be the best host to serve the data dissemination and sharing as the group members vary. For example, it may no longer be at the center of the group. This will disrupt the latency assumptions within the group and will cause the shared latency information between groups to be inaccurate. In the following sessions, a heuristic method, leader re-election, is introduced in the present invention to improve the system performance in such case.

Further, hosts with a stagnant group may suffer because the group is too small for efficiently data sharing. A small probing group is not that efficient for distributed performance measurement. An extreme case is where there is a lonely group leader which has no members in its group. In such a case, it is better for such a group leader to join another group because no efficiencies are gained by sharing its network performance information with any other host. To achieve better performance, therefore, a preferred embodiment of the infrastructure of the present invention allows the MeGroups to reform dynamically during their lifetimes. In the following sessions, a heuristic method, group combination, is introduced in the present invention to improve the system performance in such case.

Figure 9:
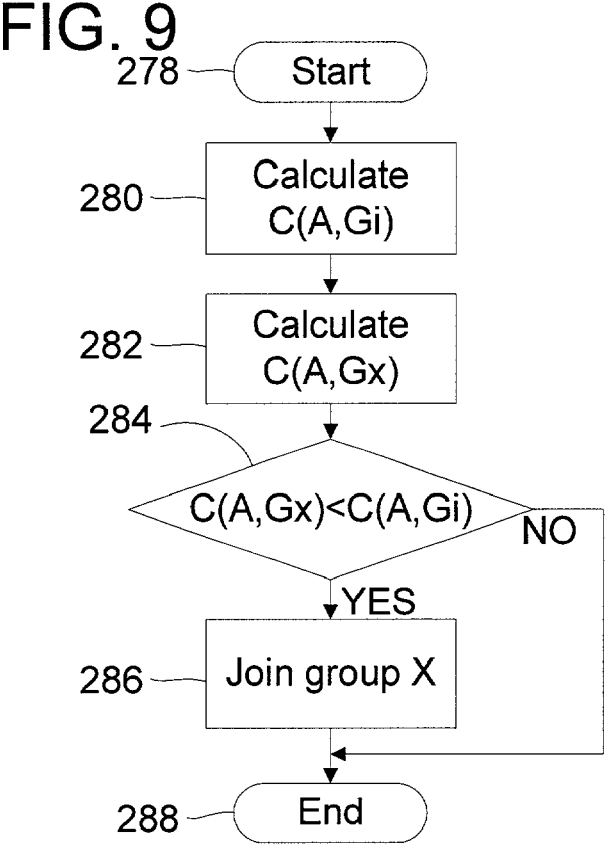
FIG. 9 is a simplified flow diagram illustrating a method of host jumping to a new probing group in accordance with the teachings of the present invention.

Embodiments of the present invention utilize several heuristic methods for reforming probing groups. In one embodiment heuristic host jumping is employed to avoid the above problems. When a host finds that its group is not suited for it anymore, it jumps to a more suitable group. As discussed above, the cost function C(A, B) is defined as the distance between host A and B. Host A's current group leader $G_i$ is the group leader of group i, and, as illustrated in FIG. 9, host A will begin 278 by determining 280 the cost function C(A, $G_i$). When host A finds out about a new group leader $G_x$ for a group x, it will calculate 282 the cost function C(A, $G_x$). Once these have been calculated, host A in Group i will find 284 a more suited group x for it when $$C(A, G_x) < C(A, G_i) \quad \text{Equation 3}$$

Stated differently, the host A will join 286 a new group when it is nearer to that other group's leader than it is to its own group leader. In this way, the above assumptions allowing for the usage of the shared network performance information are kept valid, or their validity is maximized. Once the host joins the other group, this process ends 288.

Figure 10:
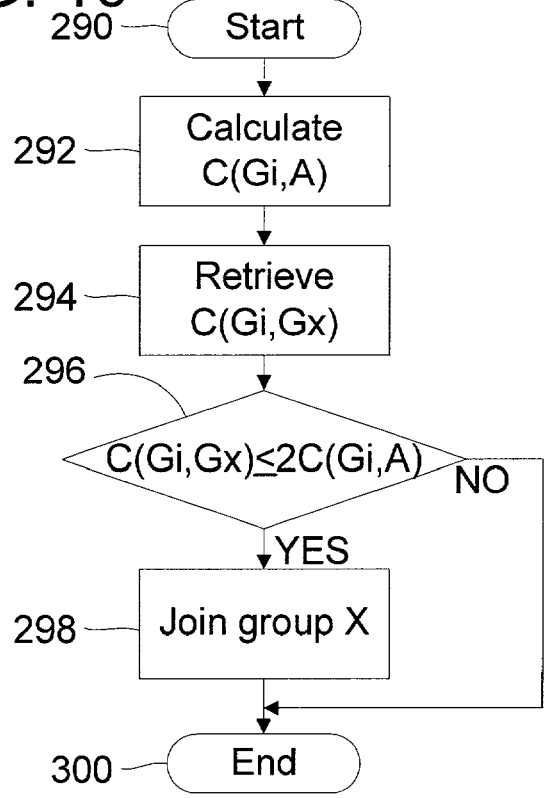
FIG. 10 is a simplified flow diagram illustrating an alternate method of host jumping to a new probing group in accordance with the teachings of the present invention.

Unfortunately, in some embodiments of the present invention, a host in any particular MeGroup may not know the distance from itself to other group leaders. In such embodiments, the process of FIG. 10 is begun 290. The host knows or can calculate 292 the distance between itself to its own group leader. In this process the host also takes advantage at step 294 of its knowledge of the distance between its group leader and the other group leaders, which information is shared. With this information the host can determine the potential groups for which it may be a more suited (closer to its group leader than the host's own). From the triangular inequality $$C(G_i, G_x) \leq C(G_i, A) + C(A, G_x) \quad \text{Equation 4}$$

The following inequality may be determined $$C(G_i, G_x) - C(G_i, A) \leq C(A, G_x) \quad \text{Equation 5}$$

Comparing with Equation 3, if the following condition satisfies $$C(G_i, G_x) - C(G_i, A) > C(A, G_x) \quad \text{Equation 6}$$

which is $$C(G_i, G_x) > 2C(G_i, A) \quad \text{Equation 7}$$

then the host can deduce at step 296 that group i is no longer a suited group for host A and it will join 298 group x before ending 300. In other words, a group x will be a potential group for host A, which is currently in group i, if $$C(G_i, G_x) \leq 2C(G_i, A) \quad \text{Equation 8}$$

Since the performance information of C($G_i$, $G_x$) and C($G_i$, A) is known for host A, it is thus possible form the inequality of Equation 8 for any host to find its potential groups. Once a host knows its potential groups, it will make probes to each group leader to verify whether this group is really a more suitable group based on Equation 3. After finding the first suitable group, it will leave current group and perform the join tasks discussed above.

As indicated above, a group leader should be at the logical center of a group. However, the particular members and the scale of any certain group vary over time due to the joining and leaving behavior of individual hosts. As such, the original group leader may not always be at this logical center of the group. Thus, it is necessary to use a re-election process to change the leader. In order to fully understand this process, it is first necessary to define the conception of the logical group center. The natural idea is to find a host which has the minimum distance to other group members. Specifically, the logical group center is the host for which the maximum distance to other hosts within the group is minimal. This determination advantageously does not require any additional network measurements.

Figure 11:
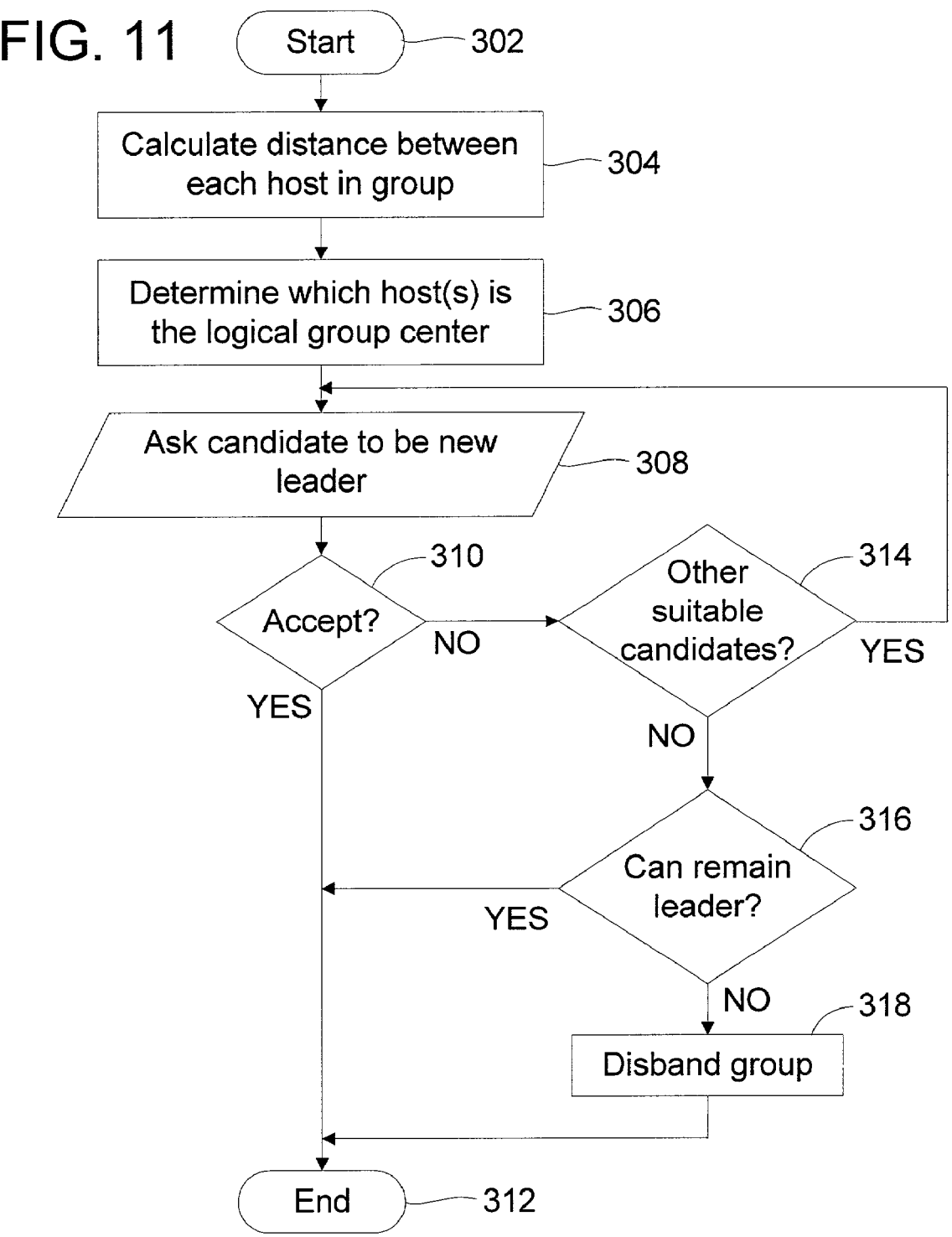
FIG. 11 is a simplified flow diagram illustrating the method of recommending a new leader for a probing group in accordance with the teachings of the present invention.

In an ideal situation, every host within a group knows which host is the suitable leader for the group since every host in the group knows all of the intra-group distances between the members. However, there may be some hosts which may not have the full distance information. To avoid unexpected attempts of leader re-election, in one embodiment the original leader will be responsible to recommend the new leader. The recommend process is illustrated in FIG. 11. Once started 302, the original leader calculates 304 the distance between each host and determines 306 which host is the most suitable host to recommend to the group as the new leader. The original leader asks 308 that candidate host whether it is willing to be a new leader. If 310 that host agrees, it will be the new leader and the process of selection will end 312. If 310 that host does not agree, and if 314 there are more than one host that may be more appropriate as the group leader than the current leader, the current leader will then ask 308 the next most appropriate candidate host to be the new leader, and so on. However, if 314 there are no more appropriate hosts and if 316 the current leader can remain the leader, the process will end 312 with that host remaining the leader. If 316, the current leader cannot remain as the leader, the MeGroup will be disbanded 318 before ending this process. At this point the hosts will attempt to find new MeGroups to join, or will form their own as discussed above.

The leader re-election process will affect the performance of all the hosts within a group, so it is not desirable to change leaders frequently. Under the criterion just discussed, the leader may be changed frequently only if there are several hosts that are at the center of a group simultaneously. In an embodiment of the present invention, another criterion issued to require that a leader remain in its position for a period of time until performing the re-election process.

Another situation when leader re-election is needed is at the time when the leader is to leave the network unexpectedly. Since almost all the hosts in the measurement group have the full mesh information about the network condition, each host who had not received any intra-group measurement information for a certain period of time can invoke this leader-re-election process.

Figure 12:
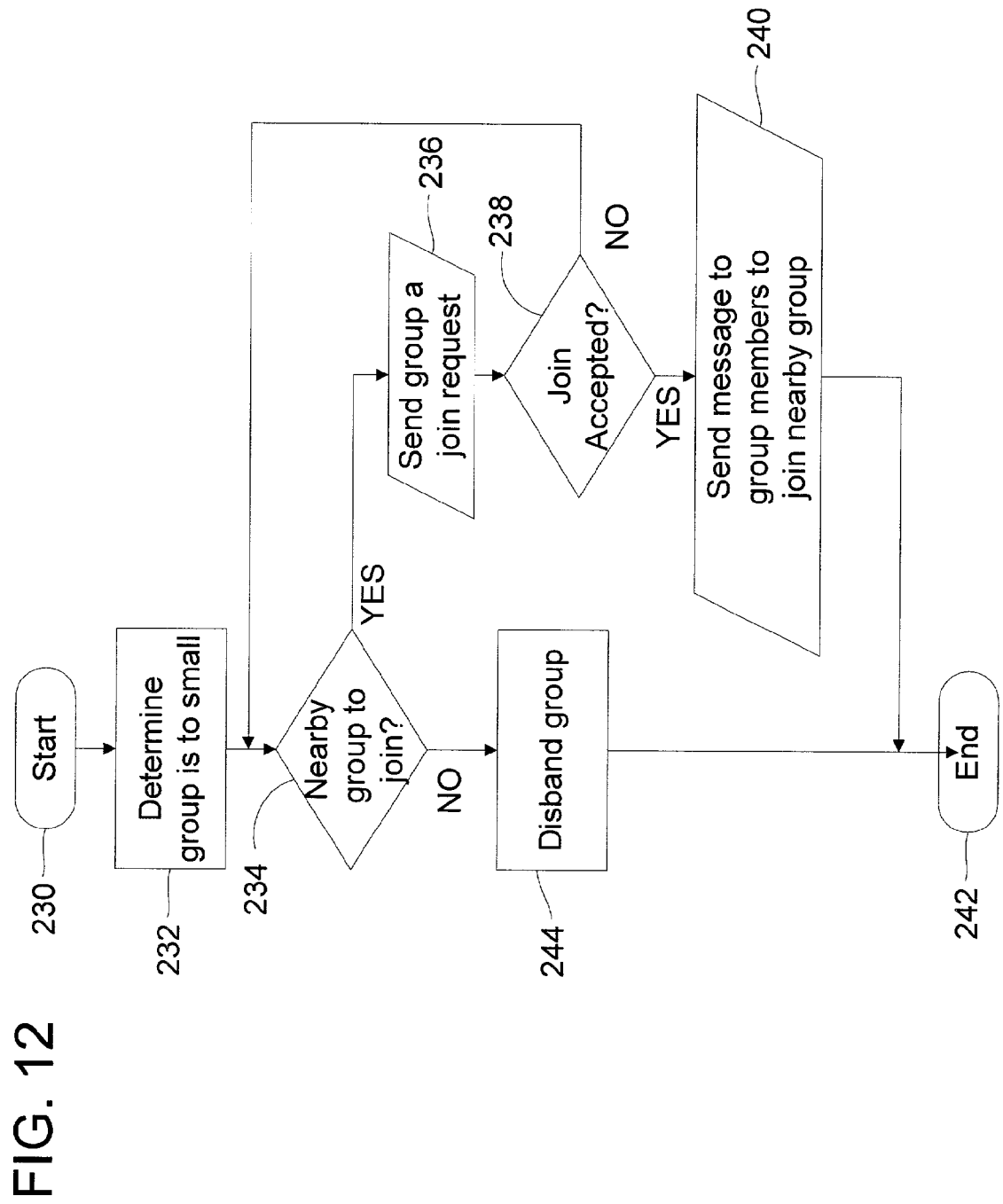
FIG. 12 is a simplified flow diagram illustrating the method of merging a small probing group with a larger probing group to increase efficiency in accordance with the teachings of the present invention.

As may now be apparent, the efficiency of the MeGroups is related to the size of each group. A small group is not efficient, since the shared measurement information is also small. When the leader of a small group finds a nearby group, it would be efficient if the whole group joins the nearby group. This process is illustrated in FIG. 12. Once begun 320, the group leader makes a determination 232 that the group is too small to be efficient. The group leader then searches for "nearby" groups to join. If 234 the leader finds such a nearby group, the group leader $G_A$ of group A (the small group) asks 236 the group leader $G_B$ of group B (the nearby group) whether it is willing to accept the group A to join. If 238 $G_B$ agrees, $G_A$ sends 240 a message to all members within group A to join group B. Each group member originally in group A will perform the task to join a group and will introduce itself to the group B members as discussed above. If 238 $G_B$ disagrees, the group A leader will cancel the request for group combination with that group, and will look to see if 234 there are any other nearby groups that may be appropriate to join. If there are no other groups to join, group A (being small and inefficient) can dismiss its members and disband 244 the group before ending 242. This will result in each host in the dismissed group joining an appropriate group as discussed above. Of course, this method will result in more traffic to the network, but in the long run may bring about more efficiency to the infrastructure.

Having discussed the group formation/reformation processes, attention is now directed to the algorithms that are used in the network performance measurement infrastructure of the present invention for intra-group and inter-group performance measurements. The measurements within a group between its host members are classified as intra-group measurements, and the measurements between groups are classified as inter-group measurements. According to their properties, different algorithms are used for the two measurement classifications.

The fundamental requirement of intra and inter-group measurement is to measure the network performance between any two hosts. To do this, prior systems have used a simple method requiring that each host measures its condition to all other hosts periodically using unicast-based probing. However, for these prior systems to perform a fulimesh probe of N hosts, they need $O(N^2)$ probing packets, which creates a large amount of traffic when N is large as is the case with the Internet.

To solve this problem, an embodiment of the present invention utilizes a multicast-based measurement method. It is well-known that multicast introduces much less traffic both from a source and to the network than unicast. Multicasting has been widely used in group communications, such as video-on-demand and video conference, and it is also very useful in the intra-group measurement of the present invention. Note that, because packets may be routed differently, the results of unicast- and multicast-based distance measurement are not equal in some cases. Nevertheless, it is not big problem in the present measurement because, as will be shown later, what is of interest in the architecture of the present invention is not the absolute distance, but the relations between the distances of different host pairs.

This multicast-based RTT measurement method has two phases. In the first phase, one host initiates a measurement by multicasting a packet to the group. Every host that received the packet will send a feedback to the original host. The original host can thus calculate the RTT to any of other hosts. Note that all feedbacks are also sent using multicast. This is advantageous because, after this phase, each host also receives some extra network performance information from the other hosts as a result of the multicast. For example, consider a group of 4 hosts, A, B, C, D. Suppose A initiates a multicast probe. After the other hosts reply to this probe, each host will receive packets as shown in the following table.

TABLE 1

| | A | B | C | D |
|---|---|---|---|---|
| A | / | A-B | A-C | A-D |
| B | A-B-A | / | A-B-C | A-B-D |
| C | A-C-A | A-C-B | / | A-C-D |
| D | A-D-A | A-D-B | A-D-C | / |

In the table, A–X represents the probe packet send from host A to host X. Since each host replies to the probing packet using multicast, host X's reply to A's probe will be received by all other hosts as well. Thus in Table 1 the reply packet multicasted from host X in reply to host A's probe and received by host Y is denoted as A-X-Y. From the table it can easily be seen that one packet is sent (from host A) and 3 packets are received by each host.

Once host A receives the reply packets from each of the other hosts (packets A-B-A, A-C-A, and A-D-A), host A knows the RTT performances to these other hosts. However, the other hosts know only the time interval between each received packet (the time of sending a packet is preferably treated as being the same time as the probing packet was received). As such, each host knows only the partial performance information related to it. Therefore, in the second phase each host multicasts its information to all other hosts so that they can calculate the full mesh of network performance information of the group. This is accomplished using a triangulation algorithm.

A simple example illustrates this concept. In this example (X,Y) is defined as the one-way trip time from sender X to receiver Y. Before this second phase the following information is available at the four hosts, respectively:

Host A:

A.1: $(A, B) + (B, A)$

A.2: $(A, C) + (C, A)$

A.3: $(A, D) + (D, A)$

Host B:

B.1: $(A, C) + (C, B) - (A, B)$

B.2: $(A, D) + (D, B) - (A, B)$

Host C:

C.1: $(A, B) + (B, C) - (A, C)$

C.2: $(A, D) + (D, C) - (A, C)$

-continued

Host D:

D.1: $(A, B) + (B, D) - (A, D)$

D.2: $(A, C) + (C, D) - (A, D)$

However, in the second phase this information is multicast to all of the hosts. Therefore, after the second phase the above information is available at all hosts, and it is easy to calculate RTT's of all host pairs. For example, adding up B.1 and C.1, we obtain $$[(A, C) + (C, B) - (A, B)] + [(A, B) + (B, C) - (A, C)] = (C, B) + (B, C) \quad \text{Equation 9}$$

This is the RTT between B and C. Similar calculations can be applied to find that B.2+D.1=RTT(B,D) and C.2+D.2=RTT(C,D). With the probing results of A.1, A.2 and A.3, the RTT's between all the host pairs can be calculated. This algorithm can be simply extended to the groups with an arbitrary number of hosts.

In accordance with an embodiment of the present invention, network performance measurement data is preferably disseminated to all the other hosts in the same group. In one embodiment, a measurement data structure used for disseminating this performance information includes the source host IP, the destination host IP, the destination group ID, and the time when measurement performed.

Preferably, the mechanism for the dissemination of the measurement data is IP multicast. This mechanism allows each host to transmit its measurement data without the necessity of coordination with other hosts. Indeed, hosts in the same group need not even be connected to transfer. In the infrastructure of the present invention, this measurement data does not have to be error-free or synchronized among hosts. Because of this, the non-guaranteed delivery characteristic of IP multicast is not a problem. In this sense, IP multicast serves as a valuable discovery mechanism as well as a distribution mechanism.

If it is not suitable or possible to form such a multicast group among hosts within a group, an embodiment of the present invention also allows the measurement data to be delivered in a peer-to-peer data transfer mode. For example, a spanning tree structure or brute-spreading structure may be utilized.

An important issue left now is how to estimate and predict network performance using the shared measured information. As discussed above, every host in the group will be aware of the following information about the network: the IP address probed by all hosts in the group; the group ID probed by all hosts in the group; the time of each probe performed; and the result of probe. The principle of measurement data expansion assumes that nearby hosts have similar network conditions. As such, this principle indicates that, within a group, all hosts can use the probe data relating to a destined host as valid data to estimate the RTT from itself to that destined host. In accordance with the principles of the present invention, the scope of this principle may be extended further. That is, in the infrastructure of the present invention the probe result data relating to the RTT to a destined host is assumed to be similar to, and thus may be used as, the RTT to any host in the group which contained the destined host, i.e. the RTT from any host in group X to any host in group Y, or simply the RTT from group X to group Y.

In applying the estimation and prediction methods of the present invention, it is assumed that the network status should be essentially stable such that some simple linear method would have a good result. In this architecture, any estimation and prediction method may be applied to the data. For example, mean-based, median-based, and auto-regressive methods are acceptable. Further, because the network performance data will be "pushed" to the hosts before they perform computation, there is no lack-of-data problem, i.e. it is not necessary for the host to consult other hosts for measurement data. Unlike prior systems, the larger the number of hosts in the network, the more measurement data can be shared, and the more accuracy and efficiency is achieved in the performance prediction.

In one embodiment of the present invention, the measurement results are weighted. While one embodiment treats each of the various types of probing data equally, this embodiment recognizes that not all data is equivalent. That is, the data which was obtained by probing by the host itself is more accurate for that host than probing data shared from other hosts. This is also true for the probing result and the predicting result. As such, this embodiment weights different measurement results, or different classifications of measurement results, differently. In one embodiment, the host distance is used to determine the weighting to be applied to the measure data. The longer the distance is, the smaller the weighting value will be.

In an alternative embodiment, triangular weighting of the measurement data is applied. To demonstrate this, suppose that host A is the host which will do the estimation, host C is the destination, host B is the leader of the group that host A resides in, and host D is the leader of the group that host C resides in. Based on the above description, host B had performed the performance measurement to host D before. Host B can estimate the network performance between itself and host C, (B, C), by the information of (B, D) and (C, D). Now consider for host A, host A knows about the network performance between itself and host B, (A, B), from which it has received the performance information to host C, (B, C), and from which it will estimate the performance between itself and host C, (A,C). From the triangular inequality discussed above, we have that (A, C) is bounded above by (A, B)+W*(B, C), and below by |(A, B)−W*(B, C)|, where W is the weighted value.

The system of the present invention also presents a measurement tool (gMeasure) to perform the network performance measurements just discussed. Given the current state of the Internet, a preferred embodiment of the gMeasure tool of the present invention does not use the Internet Control Message Protocol (ICMP). This is because ICMP packets are often filtered, dropped, or even answered by an ISP on behalf of its clients. Also, several operating systems (e.g., Solaris) limit the rate of ICMP responses. As a result, the usage of ICMP would possibly lead to incorrect performance information about the network. In a preferred embodiment, therefore, the gMeasure tool uses TCP packets. gMeasure can also use UDP packets to perform the active probing, the details can be found in another application.

When the performance is measured in an uncooperative environment with TCP packets, gMeasure relies on an exploitation of the TCP protocol to perform the sequence of packet exchanges described above. In the TCP protocol, a SYN packet pair sent to an inactive port of the remote machine is answered by a RST packet pair. Regular SYN packets are 40-byte packets, having no pay-load data. The gMeasure tool appends a large payload (e.g. 1460 bytes) to each sent SYN packet. However, the answered RST packets are small packets (40 bytes), which are unlikely to queue at a bottleneck link on the reverse path. On the local host, the gMeasure tool uses the time dispersion of the received RST packet pair as an approximation to the remote host time dispersion of the SYN packet pair. Note that this packet exchange only relies on a correct TCP implementation at the remote host and is sufficient to measure the downstream bottleneck bandwidth. On certain network links (e.g. modem lines), the packets are compressed before traversing the link. This effect can alter packet size and impact the accuracy of the packet pair measurement. Thus, the gMeasure tool appends a pre-compressed payload to the SYN packets to minimize the compression effects on the packet size.

The gMeasure tool shapes its probing traffic to reveal information about the conditions of the measured network path. As illustrated in FIG. 13, the gMeasure tool of the present invention sends a train 246 of small, 40-byte SYN packets 248$_{a-d}$ in the middle of which a large packet pair 250$_{a-b}$ (e.g. approximately 1500-byte) is placed. The remote end host 252 answers with the same size train 254 of RST packets. The gMeasure tool analyzes the time dispersion of the packets 264–274 in the train 254 and uses two heuristics that determine the presence of cross traffic, reordering, or multi-channel links.

In the first heuristic, the gMeasure tool at the probing host 256 uses the sequence number of the RST packets to determine whether the ordering of the received packets has been preserved relative to the ordering of the sent SYN packets. If the packets were reordered, the gMeasure tool discards the measurement and returns an unknown estimate. In the second heuristic, when the RST packets are not reordered, the time dispersion 258 of the two RST packets 268, 270 in the middle of the train should be larger than the dispersion 260 and 262 of any of the smaller 40-byte packet pairs 264 and 266, and 272 and 274. If not, it is likely that a rogue packet was placed between the 40-byte packet pair. This indicates the presence of cross-traffic during probing the probing operation. The gMeasure tool then discards the measurement and returns an unknown estimate.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A network performance measurement infrastructure for large scale networks having a number of hosts dispersed throughout the network, comprising a plurality of measurement groups self organized from nearby hosts, each measurement group containing a group leader, each group leader joining a first multicast group to share inter-group network performance information between measurement groups, each group leader further forming a second multicast group within its measurement group to share intra-group network performance information within that measurement group;

wherein a given measurement group will merge with a nearby measurement group to increase efficiency when determining network performance through shared network performance information.

2. The infrastructure of claim 1, wherein the measurement groups dynamically reform as hosts enter and leave the network, or the network conditions vary.

3. The infrastructure of claim 2, wherein the group leader of a dynamically reformed measurement group is a host who is located at approximately the logical center of the dynamically reformed measurement group.

4. The infrastructure of claim 3, wherein hosts in a measurement group leave that measurement group to join the dynamically reformed measurement group when the group leader of the dynamically reformed measurement group is closer to the host than its current group leader.

5. The infrastructure of claim 2, wherein the group leader of the measurement group before the measurement group dynamically reformed calculates the distance between all hosts within measurement group after the dynamic reformation, the group leader thereafter requesting a host at a logical center of the measurement group after the dynamic reformation to assume a role of group leader.

6. A network performance measurement infrastructure for large scale networks having a number of hosts dispersed throughout the network, comprising a plurality of measurement groups self organized from nearby hosts, each measurement group containing a group leader, each group leader joining a first multicast group to share inter-group network performance information between measurement groups, each group leader further forming a second multicast group within its measurement group to share intra-group network performance information within that measurement group;

wherein each host shares within its respective measurement group any network performance information that it has relative to remote hosts, and wherein hosts within each measurement group utilize the network performance information shared within its respective measurement group to estimate network performance to the remote hosts without actively measuring the network performance.

7. The infrastructure of claim 6, wherein one host within a measurement group initiates an intra-group performance measurement by multicasting a packet to the second multicast group, each host within the group responding by multicasting a response to the packet to the second multicast group, thereafter the one host calculating the round trip time (RTT) performance between itself and all other hosts within its measurement group.

8. The infrastructure of claim 7, wherein the hosts within the measurement group further multicast information relating to the packet received from the one host and to the responses received from each host from the second multicast group, the hosts thereafter calculating the RTT performance between any two hosts within their measurement group.

9. A network performance measurement infrastructure for large scale networks having a number of hosts dispersed throughout the network, comprising a plurality of measurement groups self organized from nearby hosts, each measurement group containing a group leader, each group leader joining a first multicast group to share inter-group network performance information between measurement groups, each group leader further forming a second multicast group within its measurement group to share intra-group network performance information within that measurement group;

wherein each group leader shares any network performance information that it has relative to remote hosts with group leaders of nearby measurement groups, and wherein hosts within each measurement group utilize the network performance information shared from nearby measurement groups to estimate network performance to the remote hosts without actively measuring the network performance when no such network performance information is available from another host within that hostts measurement group.

10. The infrastructure of claim 9, wherein a host actively measures the network performance to a remote host when no such network performance information is shared from within the measurement group and from nearby measurement groups.

11. A network performance measurement infrastructure for large scale networks having a number of hosts dispersed throughout the network, comprising a plurality of measurement groups self organized from nearby hosts, each measurement group containing a group leader, each group leader joining a first multicast group to share inter-group network performance information between measurement groups, each group leader further forming a second multicast group within its measurement group to share intra-group network performance information within that measurement group;
   wherein a host sends a packet train to a remote host to determine the network performance thereto, the packet train including two small synchronize (SYN) packets followed by two large SYN packets followed by two small SYN packets.

12. The infrastructure of claim 11, wherein the host receives a response packet train of reset (RST) packets from the remote host, the host discarding the response packet train when the RST packets are reordered relative to the SYN packets.

13. The infrastructure of claim 11, wherein the host receives a response packet train of six reset (RST) packets from the remote host, the host discarding the response packet train when a time dispersion between third and fourth RST packets is shorter than time dispersions between first and second, and fifth and sixth packets.

14. A network performance measurement infrastructure for large scale networks having a number of hosts dispersed throughout the network, comprising a plurality of measurement groups self organized from nearby hosts, each measurement group containing a group leader, each group leader joining a first multicast group to share inter-group network performance information between measurement groups, each group leader further forming a second multicast group within its measurement group to share intra-group network performance information within that measurement group;
   wherein a host weights network performance information inversely based on a distance between itself and another host from which the network performance information is shared.

15. A method of determining network performance for a large scale network having a plurality of hosts distributed throughout the network, comprising the steps of:
   forming at least one measurement group from nearby hosts;
   within each of the at least one measurement groups, multicasting by one host a packet to other hosts in its associated measurement group to determine intra-group network performance;
   multicasting by the other hosts in the measurement group to the hosts in that measurement group a response to the packet;
   calculating by the one host the round trip time (RTT) performance between itself and all other hosts within that measurement group;
   multicasting by the other hosts within the at least one measurement group information relating to the packet received from the one host and relating to the is responses received from each of the other hosts; and
   calculating, by each of the other hosts, the RTT performance between any two hosts within their measurement group.

16. A method of determining network performance for a large scale network having a plurality of hosts distributed throughout the network, comprising the steps of:
   forming at least one measurement group from nearby hosts;
   within each of the at least one measurement groups, multicasting by one host a packet to other hosts in its associated measurement group to determine intra-group network performance;
   multicasting by the other hosts in the measurement group to the hosts in that measurement group a response to the packet;
   calculating by the one host the round trip time (RTT) performance between itself and all other hosts within that measurement group;
   wherein the step of forming at least one measurement group comprises the steps of:
   joining a first multicast group;
   sending a request message to the first multicast group, the request message having a large time to live (TTL);
   forming a new measurement group when no response is received within a predetermined latency;
   assuming a role of leader of the new measurement group; and
   forming a second multicast group for intra-group communication.

17. The method of claim 16, further comprising the steps of:
   receiving a multicast request message from a new host;
   responding to the request message;
   receiving new host information multicast from the new host on the second multicast group; and
   replying to the new host on the second multicast group.

18. The method of claim 17, further comprising the steps of:
   calculating, by the group leader, a distance between each host the measurement group;
   determining which host in the measurement group is the logical center of the measurement group; and
   requesting that the host which is the logical center of the measurement group assume the role of group leader.

19. A method of determining network performance for a large scale network having a plurality of hosts distributed throughout the network, comprising the steps of:
   forming at least one measurement group from nearby hosts;
   within each of the at least one measurement groups, multicasting by one host a packet to other hosts in its associated measurement group to determine intra-group network performance;
   multicasting by the other hosts in the measurement group to the hosts in that measurement group a response to the packet;
   calculating by the one host the round trip time (RTT) performance between itself and all other hosts within that measurement group;

determining by one host in a measurement group network performance between itself and a remote host; and multicasting the network performance to the other hosts in its associated measurement group for use by the other hosts in the measurement group to estimate the network performance to the remote host without actively communicating with the remote host.

20. The method of claim 19, further comprising the step of multicasting to group leaders of nearby measurement groups the network performance to the remote host for use by the nearby measurement groups to estimate the network performance to the remote host without actively communicating with the remote host.

21. The method of claim 19, wherein the step of determining by one a host in a measurement group network performance between itself and a remote host comprises the steps of:

transmitting a packet train of synchronize (SYN) packets to the remote host; and analyzing a return packet train of reset (RST) packets from the remote host.

22. The method of claim 21, wherein the step of transmitting comprises the step of transmitting a packet train of six SYN packets including two small SYN packets followed by two large SYN packets followed by two small SYN packets.

23. The method of claim 21, wherein the step of analyzing comprises the steps of analyzing an ordering of the RST packets, and discarding the RST packet train when the RST packets have been reordered relative to the SYN packets.

24. The method of claim 21, wherein the step of analyzing is comprises the steps of analyzing time dispersion between RST packets, and discarding the RST packet train when at least one of the time dispersions between a first and a second RST packet, and a fifth and a sixth RST packet is not less than a time dispersion between a third and a fourth RST packet.

25. A method of determining network performance for a large scale network having a plurality of hosts distributed throughout the network, comprising the steps of:

forming at least one measurement group from nearby hosts;

within each of the at least one measurement groups, multicasting by one host a packet to other hosts in its associated measurement group to determine intra-group network performance;

multicasting by the other hosts in the measurement group to the hosts in that measurement group a response to the packet;

calculating by the one host the round trip time (RTT) performance between itself and all other hosts within that measurement group;

wherein the step of forming at least one measurement group comprises the step of merging a given measurement group into a nearby measurement group.

26. A method of determining network performance for a large scale network having a plurality of hosts distributed throughout the network, comprising the steps of:

forming at least one measurement group from nearby hosts;

within each of the at least one measurement groups, multicasting by one host a packet to other hosts in its associated measurement group to determine intra-group network performance;

multicasting by the other hosts in the measurement group to the hosts in that measurement group a response to the packet;

calculating by the one host the round trip time (RTT) performance between itself and all other hosts within that measurement group;

wherein the step of forming at least one measurement group comprises the step of disbanding a given measurement group so that the hosts therein may join a nearby measurement group.

* * * * *